United States Patent [19]

Heim

[11] 3,721,123
[45] March 20, 1973

[54] GAS-FLOW MONITORING SYSTEM
[76] Inventor: Joseph Heim, 728 N.E. Floral Place, Portland, Oreg. 97232
[22] Filed: Feb. 17, 1972
[21] Appl. No.: 227,104

[52] U.S. Cl. ............73/194 E, 73/229, 324/175, 250/231 SE
[51] Int. Cl. ............G01f 1/00
[58] Field of Search ............73/194 E, 229, 231, 198; 324/175; 250/231 SE, 233, 205; 307/311

[56] References Cited

UNITED STATES PATENTS

| | | | |
|---|---|---|---|
| 3,156,115 | 11/1964 | Adelmann | 73/198 |
| 3,175,152 | 3/1965 | Shafer | 324/175 |
| 3,622,801 | 11/1971 | Stone | 307/311 XR |
| 3,631,250 | 12/1971 | Buskirk | 250/205 |

Primary Examiner—Charles A. Ruehl
Attorney—Jon M. Dickinson

[57] ABSTRACT

A gas-flow monitoring system employing an apertured rotor whose apertures, with turning of the rotor, alternately block and pass a beam of light between a light-emitting diode and a phototransistor. The diode and phototransistor are connected in a circuit wherein current that flows through the phototransistor also flows through the diode to change the intensity of light emitted from the diode. This circuit produces an output signal each time that the diode and phototransistor communicate with one another through a different successive aperture in the rotor.

14 Claims, 4 Drawing Figures

PATENTED MAR 20 1973 3,721,123

GAS-FLOW MONITORING SYSTEM

BACKGROUND AND SUMMARY OF THE INVENTION

This invention pertains to a gas-flow monitoring system. More particularly, it pertains to such a system especially suited to monitoring the flow of gas at remote locations, and constructed to produce accurate and reliable information even at very low rates of gas flow.

According to a preferred embodiment of the invention, the proposed monitoring system employs an apertured rotor drivingly connected to a turbine which is turned at a speed directly proportional to the speed of gas flow in a conduit. Positioned adjacent the rotor, and on axially opposite sides thereof, are a light source and a light sensor, adapted to communicate with one another (via a beam of light) intermittently through successive apertures in the rotor with the latter turning. A sufficient number of apertures are provided in the rotor to assure that, even at very low flow rates, a sufficient short time interval exists between successive communications between the source and sensor to produce satisfactory data.

To maximize accuracy and reliability in the system, as will be explained more fully below, the light-emitting diode and phototransistor in the system are connected through a novel circuit, wherein current that flows through the phototransistor when it conducts also flows through the diode, thus to change the intensity of light emitted from the diode. This important feature greatly minimizes the chance that the proposed system will respond more than once (per revolution of the rotor) to the passage of a given aperture between the light-emitting diode and the phototransistor. Multiple responses to such a single passage of an aperture, but for the novel circuit construction contemplated herein, might otherwise occur, particularly at relatively low gas flow rates, as the result of vibrations of parts in the system. Such multiple responses, of course, can yield highly inaccurate data.

DESCRIPTION OF THE DRAWINGS

These and other objects and advantages attained by the invention will become more fully apparent as the description which follows is read in conjunction with the accompanying drawing, wherein.

DETAILED DESCRIPTION OF THE INVENTION

Figure 1:
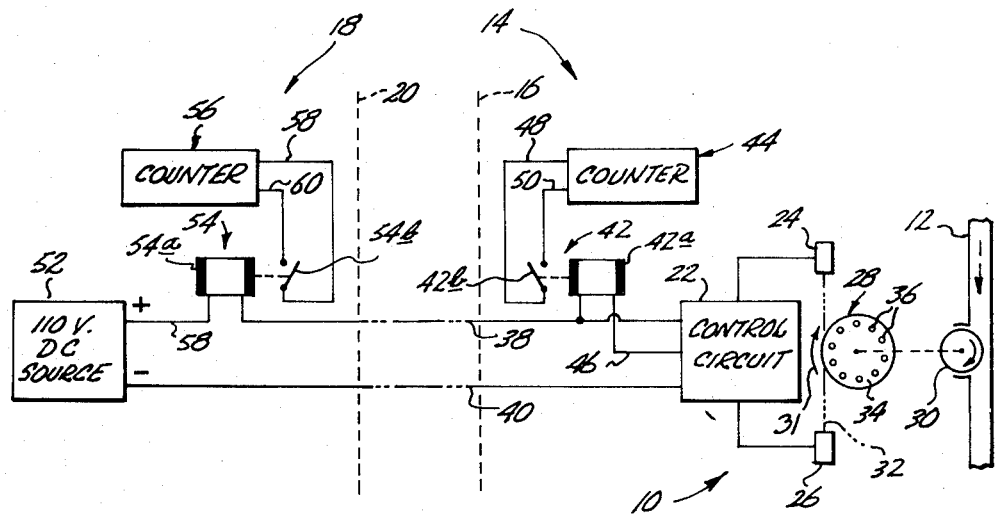
FIG. 1 is a greatly simplified schematic diagram, partly in block form, illustrating components of the system of the present invention, installed to monitor the flow of gas in a remotely located conduit.

Turning now to the drawings, and referring first to FIG. 1, indicated generally at 10 are parts of a gas-flow monitoring system constructed in accordance with the present invention. As shown in this figure, system 10 has been installed to monitor the flow of natural gas in a conduit 12, located at what might be thought of as a remote station, or site, 14 indicated generally to the right of dashed line 16 in the figure. By way of example, remote station 14 might be the location of a facility of a natural gas-using customer of a local natural gas company. Conduit 12 is the conduit through which gas is supplied from the company to equipment at station 14.

Indicated generally at 18 in FIG. 1, generally to the left of dashed line 20, is what might be thought of as a local monitoring station, distant from station 14, which may be located in the facilities of the local gas company mentioned above.

Explaining now more fully what is shown in remote station 14, and with specific reference first to components of the system proposed by the invention, the same includes a control circuit 22, through which are interconnected a light-emitting diode, or light source, 24, and a phototransistor, or light sensor, 26. Diode 24 and phototransistor 26 are positioned adjacent and on axially opposite sides of a rotor, or movable metering device, 28 which is drivingly connected to a conventional gas-flow metering turbine 30 suitably mounted to be turned under the influence of gas flowing (as indicated by the arrow) in conduit 12. Rotor 28 turns in the direction of arrow 31. The diode and phototransistor are located adjacent the periphery of rotor 28, and are aligned whereby they are adapted, so-to-speak, to look at, or communicate with, one another along line 32 which intersects the rotor.

To promote intermittent communication between the diode and phototransistor, as contemplated herein, rotor 28 includes a generally circular light-opaque body 34, in which are formed ten circumferentially distributed, uniformly angularly spaced, axially extending apertures, such as apertures 36. Apertures 36, also referred to as passive light-transmitting means, are each disposed at substantially the same radial distance from the axis of rotation of body 34, and with turning of the rotor intermittently expose diode 24 and phototransistor 26 to one another. Light from diode 24 can shine on phototransistor 26 herein only through an aperture 36.

While sizes of parts may vary to take care of different applications, rotor 28 might typically have a diameter of about 1 ⅜ inches, and a thickness (measured axially) of about ⅛ inches. Apertures 36, which extend axially completely through the thickness of the rotor body, might typically be centered on a circle having a diameter of about 1 ¼ inches, and might each have a diameter of about ⅛ inches. As was mentioned above, 10 apertures are provided in rotor 28. It is appreciated, however, that a greater or lesser of number of apertures may be used.

The rate of gas flow in conduit 12 might typically vary anywhere from about 1.4 cubic feet per minute to about 500 cubic feet per minute. With the higher flow rate mentioned, turbine 30 herein turns rotor 28 at a speed of about ½ revolution per minute. Under such circumstances, diode 24 and phototransistor 26 communicate with one another through an aperture about five times per minute. At the lower flow rate mentioned, turbine 30 turns rotor 28 at a speed of about one revolution every twelve hours. Under these circumstances, the diode and phototransistor communicate with one another through an aperture once about every 72 minutes.

System 10 is conveniently connected herein to apparatus at local station 18 through a conventional phone line pair containing conductors 38, 40. In station 14, these conductors are connected, as will be more fully explained, to control circuit 22. System 10, in station 14, is also connected to conventional counting equipment including a relay 42 and an electromechanical counter 44. One side of coil 42a in the relay is connected by a conductor 46 to control circuit 22. The other side of this coil is connected directly to conductor 38. Opposite sides of normally open contact 42b in the relay are connected by conductors 48, 50 to the usual input terminals of counter 44.

Provided in local station 18 is a source 52 of DC voltage, a relay 54 (which is essentially the same in construction as relay 42), and a counter 56 which is substantially the same as counter 44). Source 52 is conventional in construction, produces a voltage of about 110 volts DC, and has its negative output terminal connected to conductor 40, and its positive output terminal connected through a conductor 58 to one side of coil 54a in relay 54. The other side of coil 54a is connected to conductor 38. Normally open contact 54b in relay 54 has its opposite sides connected through conductors 58, 60 to the input terminals of counter 56.

Figure 2:
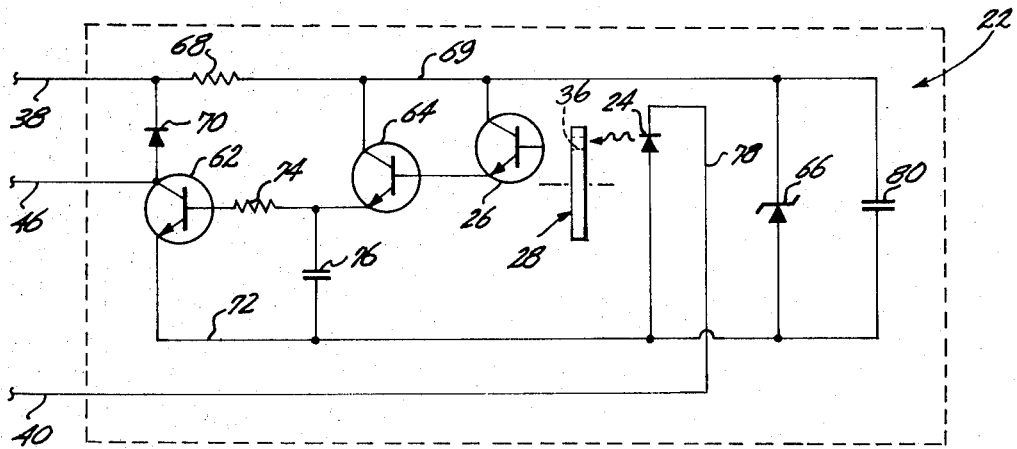
FIG. 2 is a circuit diagram further illustrating the proposed system.

Turning now to FIG. 2 which illustrates details of control circuit 22, and the connections therein provided for diode 24 and phototransistor 26, circuit 22 includes transistors 62, 64, and a Zener diode 66. Diode 24 and phototransistor 26, as well as all of the other components shown in FIG. 2, are conventional in construction. While diode 24 may take the form of various commercially available light-emitting diodes, a device which has been found to perform particularly well herein is an infrared-emitting diode made by Motorola, and designated by it as a diode No. MLED 60. Similarly, while various conventional phototransistors may be used for phototransistors 26, a conventional type-2N5777 phototransistor, made by numerous manufacturers, has been found especially suitable.

Conductor 38 applies positive voltage through a resistor 68 to a conductor 69 which is connected to the collector of transistor 64 and to that of phototransistor 26. Conductor 69 is also connected to the cathode of Zener diode 66. The collector of transistor 62 is connected directly to conductor 46, and is connected through a diode 70 to conductor 38. The emitter of transistor 62 is connected to a conductor 72.

The emitter of transistor 64 is connected through a resistor 74 to the base of transistor 62, and through a capacitor 76 to conductor 72. The base of transistor 64 is connected to the emitter of phototransistor 26. The base of the phototransistor is left floating (i.e., unconnected to anything external to the phototransistor).

The anode of diode 24 is connected to conductor 72, and the cathode of this diode is connected through a conductor 78 to conductor 40.

The anode of Zener diode 66 is connected to conductor 72. Disposed in parallel with the Zener diode is a capacitor 80. Diode 66 functions to establish a regulated DC voltage, of about 22 volts, between conductors 69, 72, with the former positive relative to the latter.

Explaining now how the apparatus illustrated and described herein performs, and assuming that rotor 28 is in a condition blocking light from diode 24 to phototransistor 26, under these circumstances transistors 62, 64 and phototransistor 26 are nonconductive. Diode 24 emits a small amount of light (infrared) as the result of a relatively small DC current (about 2 milliamperes) flowing through it. Such current flows in conductor 38, resistor 68, conductor 69, Zener diode 66, diode 24 and conductors 78, 40. This current also flows through coil 54a but is too small to cause closure of contact 54b.

Figure 3:
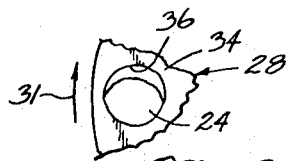
FIGS. 3 and 4 are enlarged fragmentary views showing two different important degrees of exposure of a light source which is employed in the system of FIGS. 1 and 2.

With gas flowing in conduit 12, turbine 30 turns, and rotates rotor 28. As an aperture in the rotor begins to expose the phototransistor to light from diode 24, initially no appreciable change takes place in the condition of circuit 22. The light-sensitive region in the phototransistor, of course, begins to receive a greater and greater amount of light from diode 24. With the system described herein, and according to an important feature of the invention, when an aperture (after beginning to expose the phototransistor to light from diode 24) has exposed the phototransistor to somewhere between about 60 and 75 percent of the then available light from diode 24 which can be passed through the aperture, the phototransistor switches into a conducting state. By this action, phototransistor 26 causes transistors 62, 64 also to switch into conducting states. This situation is illustrated in FIG. 3, which is a view taken along line 32 looking through an aperture 36 at diode 24. In this figure, it can be seen that diode 24 is visible in about 60 to 75 percent of the cross-sectional area of the aperture. Such action results in a rapid increase in the DC current flowing in conductors 38, 40, such an increase being referred to herein as an output signal.

The increase in current, just mentioned, which occurs following initial turning-on of transistor 26 produces two effects of particular interest herein. First, the initial increase in current, attending initial turning-on of the phototransistor, flows through diode 24, causing a slight increase in the intensity of light emitted from the diode. This increase in light intensity, coupled with the fact that an aperture in rotor 28 continues to move in a way more fully exposing the phototransistor to light from the diode, tends to accelerate the turning-on of the phototransistor, which, in turn, further increases current flow through the light-emitting diode which, in turn, further increases its light intensity. It is thus apparent, that with the phototransistor and light-emitting diode interconnected in such a manner that current which flows through the former also flows through the latter, an "avalanche" or "accelerator" type action occurs which results in the system responding rapidly and very positively to the occurrence of a communication between the phototransistor and light-emitting diode. This feature is, of course, important in contributing to reliability in the proposed system.

Second, the increased current flow (to about 20 milliamperes) in conductor 38, and the turning-on of transistor 62, result in relay contacts 42b, 54b closing to generate a count in each of counters 44, 56. These counters, then, each update by a count of one the count previously stored in them.

Figure 4:
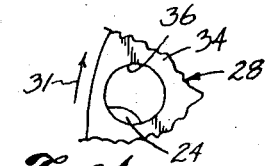

With the phototransistor, and transistors 62, 64, fully conducting, nothing further changes until the aperture whose movement initiated such conduction has traveled sufficiently far out of the path between diode 24 and phototransistor 26 to reduce the transmission of light therebetween below a certain amount. More specifically, and according to another important feature of the invention, on the aperture moving sufficiently far whereby the phototransistor becomes exposed to about 10% or less of the then-available light from diode 24 which can pass through the aperture, the phototransistor switches back to a nonconducting state. This situation is shown in FIG. 4, which is taken from the same point of view as FIG. 3. Here, it can be seen that diode 24 is visible only in about 10% or less of the cross-sectional area of aperture 36. Such action results in transistors 62, 64 also turning off, and in solenoid contacts 42b, 54b reopening.

It is significant to note that the degree or amount of physical exposure (about 10 percent or less) of diode 24 through an aperture, below which it is necessary to go to effect turning-off of the phototransistor, is considerably smaller than that (about 60–75 percent) which must be reached initially to turn the phototransistor on. As a consequence, if vibration should occur substantially simultaneous with turning-off of the phototransistor, which vibration tends to "reverse-rotate" rotor 28 in a manner slightly increasing the amount of exposure, the phototransistor will not turn back on to produce what would be a false count in the counters. Such a vibration, which might typically be capable of increasing exposure through the now-passing aperture by as much as about 10–15 percent, obviously will not cause the rotor to reverse-rotate sufficiently to produce the large amount of exposure required for turning on the phototransistor.

This feature is particularly important under circumstances of low gas-flow rates, where the rotor turns slowly. For, it is in such a situation that the effect on the rotor of a vibration is the most pronounced.

The proposed system, therefore, affords a reliable and accurate means for monitoring gas-flow. The apparatus of the system is especially adapted for use in monitoring such flow at remote locations. Readings taken from a counter, such as counters 44, 56, can easily be interpreted to indicate desired flow information.

Apart from the reliability features discussed above, the system of the invention offers still another important advantage. More specifically, all of its components can readily and very safely be used directly inside a gas-filled environment, without fear of explosion. Installing and packaging of the system can, therefore, be greatly simplified.

While a preferred embodiment of the invention has been described, it is appreciated that variations and modifications may be made without departing from the spirit of the invention.

It is claimed and desired to secure by Letters Patent:

1. In a system for monitoring the flow of gas in a conduit
    a movable metering device adapted to be driven by such a flow thus to be moved at a speed related to the speed of such flow, said metering device including a plurality of spaced-apart passive light-transmitting means,
    a light source and a light sensor each positioned adjacent said metering device, adapted to communicate intermittently with one another via successive ones of said light-transmitting means with said metering device moving, and
    electrical circuit means operatively connected both to said source and to said sensor controlling the intensity of said source in response to the amount of light received therefrom by said sensor,
    said circuit means producing an output signal each time that said source and sensor communicate with one another through a different successive light-transmitting means.

2. The system of claim 1, wherein said sensor comprises a light-sensitive electronic switching device.

3. The system of claim 2, wherein said switching device has a conductive state to which it switches on becoming exposed by a certain amount to light from said source, and a nonconductive state to which it switches on becoming exposed by a lesser amount than said certain amount to light from said source.

4. The system of claim 2, wherein said switching device comprises a phototransistor.

5. The system of claim 2, wherein said source comprises a light-emitting diode.

6. The system of claim 1, wherein each of said light-transmitting means comprises a light-permeable aperture in said metering device.

7. The system of claim 1, wherein said metering device comprises a rotor.

8. The system of claim 7, wherein said rotor comprises an opaque body, and each of said light-transmitting means comprises a light-permeable aperture in said body.

9. The system of claim 1, wherein said light-transmitting means are uniformly spaced.

10. The system of claim 1, wherein said circuit means includes means interconnecting said source and said sensor producing an increase in the intensity of light from said source with an increase in the amount of light received therefrom by said sensor, and vice versa.

11. The system of claim 10, wherein said sensor has a conductive state to which it switches on becoming exposed by a certain amount to light from said source, and a nonconductive state to which it switches on becoming exposed by a lesser amount than said certain amount to light from said source.

12. A system for monitoring the flow of gas in a conduit comprising
    a movable metering device adapted to be driven by such a flow thus to be moved at a speed related to the speed of such flow, said device including an opaque body, and a plurality of spaced-apart light-permeable apertures in said body,
    a light source positioned adjacent said body adapted to shine light through successive ones of said apertures with said device moving,
    a light sensor also positioned adjacent said body adapted to receive light shone through successive ones of said apertures by said source, and
    electrical circuit means operatively interconnecting said source and sensor, controlling the intensity of said source whereby the magnitude of such intensity at any given time is related to the amount of light received by said sensor from said source,
    said circuit means producing an output signal each time that said source and sensor communicate with one another through a different successive aperture.

13. The system of claim 12, wherein said circuit means includes means interconnecting said source and said sensor producing an increase in the intensity of light from said source with an increase in the amount of light received therefrom by said sensor, and vice versa.

14. The system of claim 13, wherein said sensor has a conductive state to which it switches on becoming exposed by a certain amount to light from said source and a nonconductive state to which it switches on becoming exposed by a lesser amount than said certain amount to light from said source.

* * * * *